United States Patent [19]

Dahlin et al.

[11] Patent Number: 4,869,285

[45] Date of Patent: Sep. 26, 1989

[54] FLOW SELECTOR DEVICE

[76] Inventors: Dale L. Dahlin, 632 N. Mountainview; Edward D. Dahlin, 3110 Carmichael #4, both of Moscow, Id. 83843

[21] Appl. No.: 229,834

[22] Filed: Aug. 8, 1988

[51] Int. Cl.[4] .............................................. F16K 25/00

[52] U.S. Cl. .................................... 137/270; 137/556; 251/159; 251/162; 251/163; 251/206

[58] Field of Search ................ 137/270, 556; 257/159, 257/162, 163, 206, 208

[56] References Cited

U.S. PATENT DOCUMENTS

| | | | |
|---|---|---|---|
| 2,702,178 | 2/1955 | Scholl | 251/159 X |
| 3,326,232 | 6/1967 | Stamps et al. | 251/207 X |
| 3,558,100 | 1/1971 | Hulsey | 251/207 |
| 3,893,927 | 7/1975 | Cronfel | 251/207 X |
| 4,161,307 | 7/1979 | Clinch et al. | 251/206 |
| 4,373,548 | 2/1983 | Chou | 251/207 X |
| 4,446,887 | 5/1984 | Redmon et al. | 251/206 X |
| 4,582,084 | 4/1986 | Gyurovits | 251/206 X |
| 4,679,768 | 7/1987 | Hardy | 251/159 |

*Primary Examiner*—John Rivell

*Attorney, Agent, or Firm*—Wells, St. John & Roberts

[57] ABSTRACT

A flow selector device makes use of an annular plate having a plurality of flow control orifices spaced about its perimeter. The plate is rotatably received within a housing that includes a first fluid conduit formed therein. The plate is selectively rotated to bring any one of the orifices therein into alignment with an open end of the first conduit by means of a removable cover on the housing. The conduit includes an annular seal about its open end and against which the orifice plate is pressed to seal the selected orifice within a fluid flow passage. A second fluid conduit is also provided and is connected to a clamp device mounting an open end of the conduit and a second annular seal. A clamp device is manually operable to securely clamp the plate between the seals, securing the plate in position with the selected orifice in line with and connecting the fluid flow conduits. The clamp device is also operable to release clamping pressure and thereby allow selective rotation of the orifice plate to bring a selected orifice into alignment with the conduit openings. The plate includes two sets of orifices arranged so that the plate may be inverted to bring either of the sets of orifices into operative positions where they may be selectively rotated into alignment with the conduit openings.

18 Claims, 7 Drawing Sheets

FIG. 10
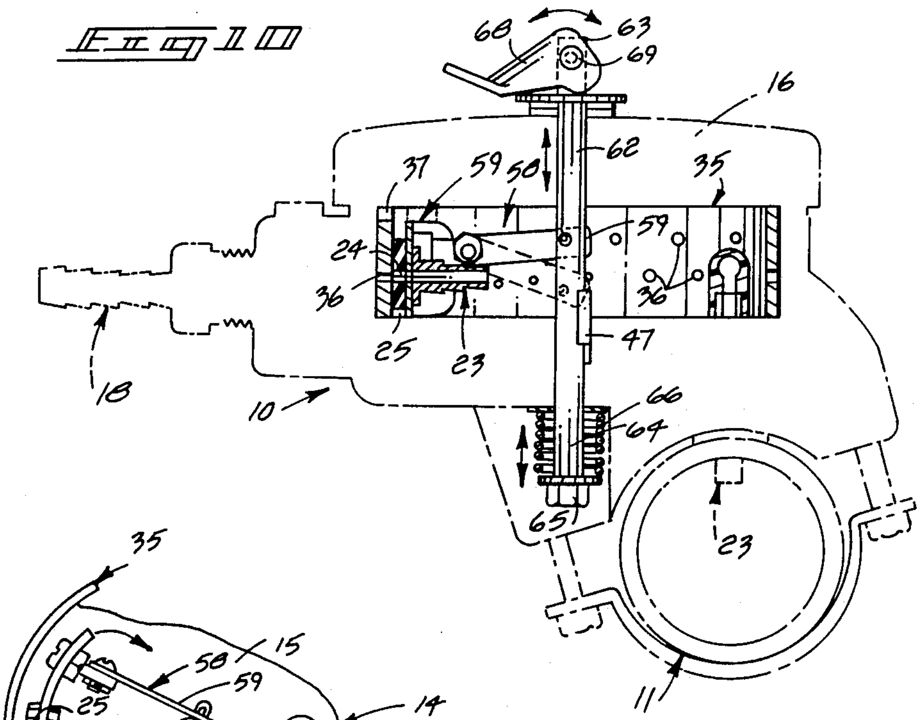
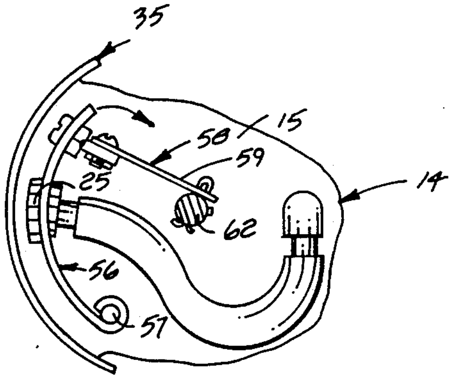
FIG. 11
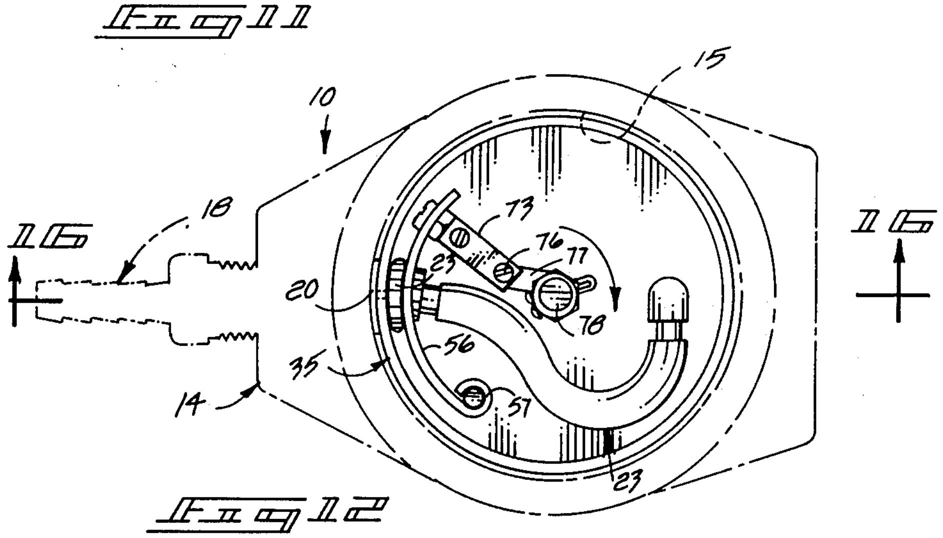
FIG. 12

FLOW SELECTOR DEVICE

TECHNICAL FIELD

The present invention relates to flow selection devices and more particularly to such devices that control fluid flow by selectively positionable orifices within a flow control device body.

BACKGROUND OF THE INVENTION

There has existed a considerable problem, particularly in the fertilizer spraying industry, relating to adjustment of flow control for the materials being dispensed. There are a variety of chemicals, for example, that may be utilized with spraying equipment. Each chemical includes a preferred application rate. Flow of the chemical may be controlled, at least in part, by placing a sized orifice upstream from each dispensing outlet. In a typical fertilizer spraying implement, for example, an orifice fitting is situated immediately upstream from each spray head, connecting the spray head to a fertilizer delivery manifold. In order to change the flow of fertilizer, it becomes necessary to change the small orifice disk of each fitting. The process, though not complicated, involves a considerable amount of time and frustration. The small circular orifice plates are relatively difficult to handle and, in adverse conditions, can easily be dropped and lost.

It therefore becomes desirable to obtain some form of device that will facilitate changing of orifice size without requiring disassembly and replacement of a single orifice plate.

Various apparatus have been developed including orifice selection capability. However, these apparatus require relatively elaborate sealing procedures in order to prevent leakage of fluid from the vicinity of the orifice selection mechanism. Furthermore, many of these apparatus are relatively complex and may not be easily disassembled for cleaning or repair.

The present device incorporates variable orifice selection features with provisions for selectively sealing the selected orifice in position within the flow line in a simple yet very effective manner.

BRIEF DESCRIPTION OF THE DRAWINGS

Preferred embodiments of the invention are illustrated in the accompanying drawings, in which:

FIG. 10 is a operational view of the clamp form illustrated in FIG. 9;

FIG. 11 is a fragmented top plan view of the mechanism as seen from above in FIG. 9;

FIG. 12 is a top plan view illustrating another form of clamping mechanism;

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

In order to gain a better understanding of the present invention, a brief description and drawing are included of a prior art form of orifice selector that is typically used in fertilizer applying apparatus for varying flow of fertilizer to applicator heads.

Figure 1:
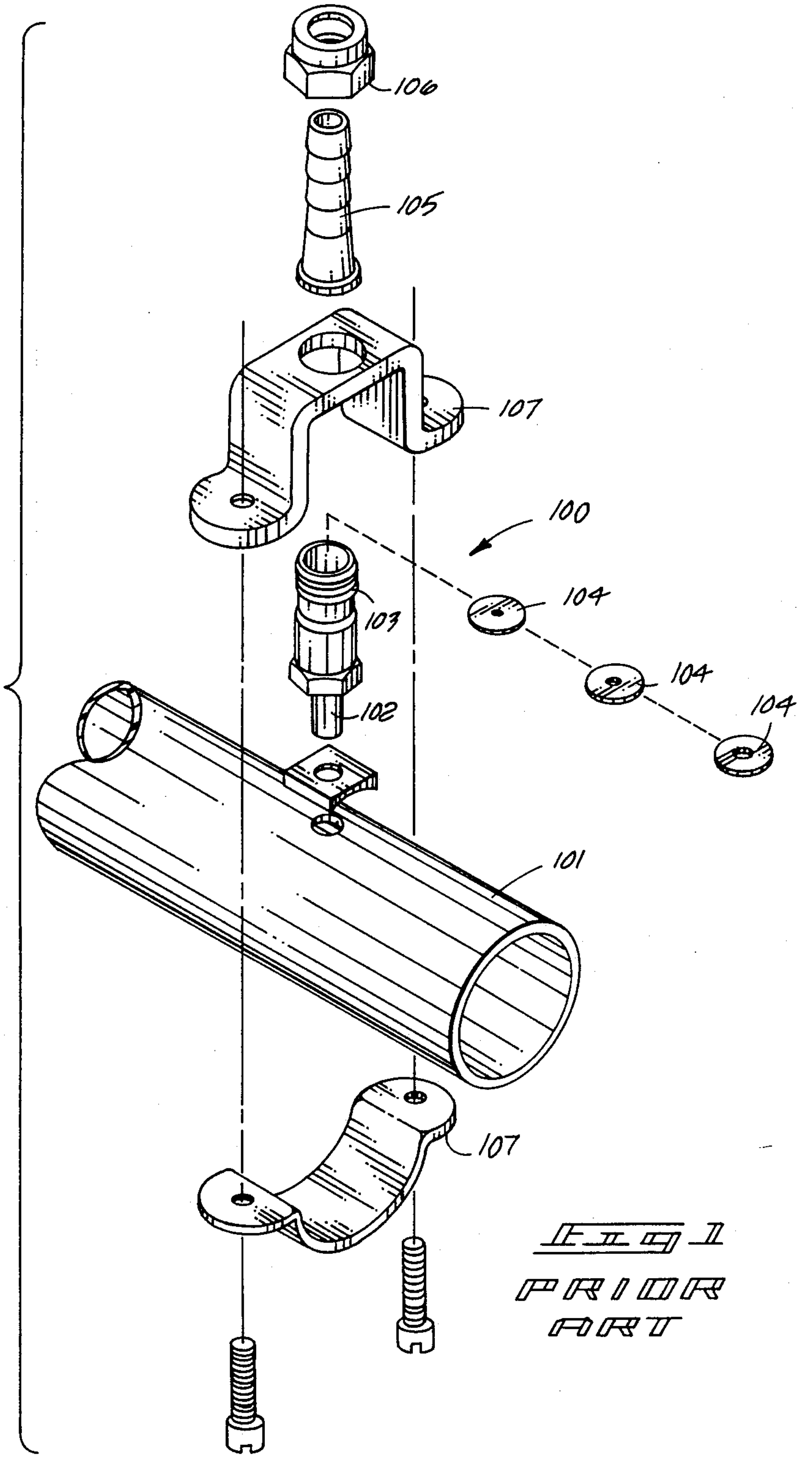
Fig 1 PRIOR ART
FIG. 1 is an exploded perspective view of a prior art orifice flow controlling device, also illustrating three individual orifice control plates mountable thereto.
Figure 2:
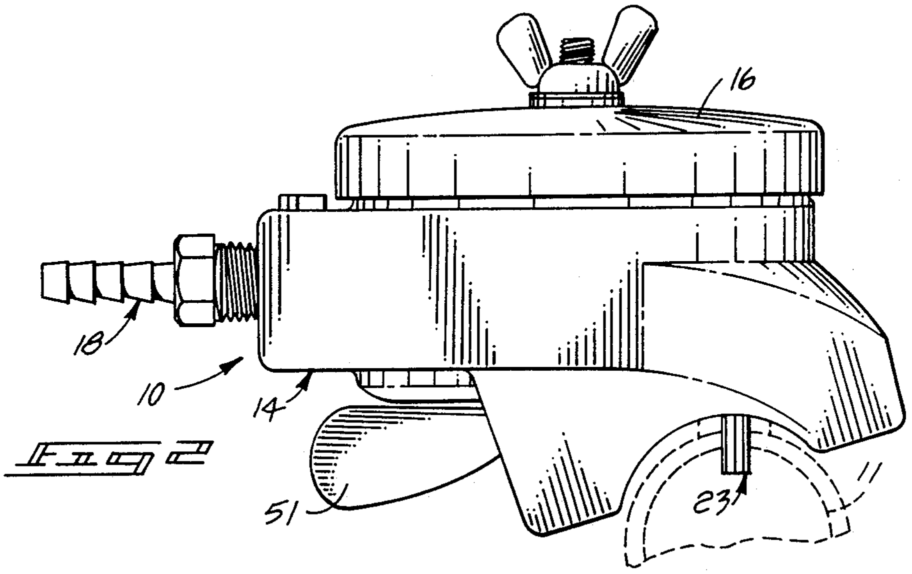
FIG. 2 is a side elevation view of the present invention.
Figure 3:
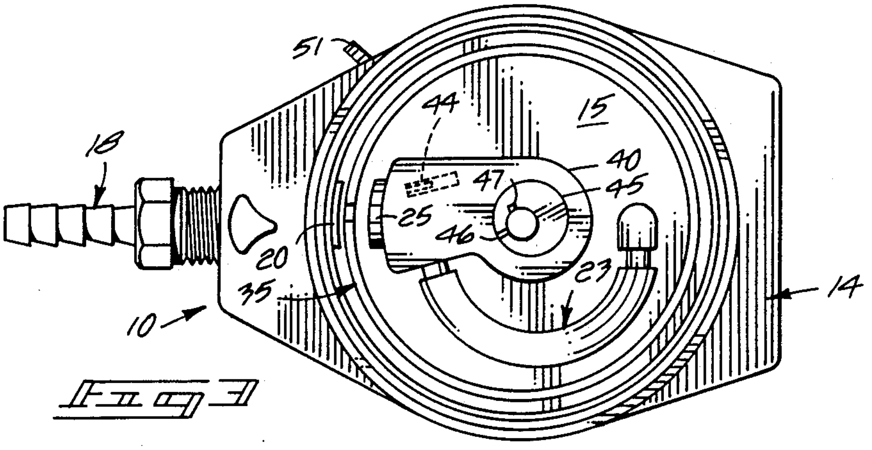
FIG. 3 is a top plan view of the invention only showing a cover cap thereof removed to show a first form of clamping means.
Figure 4:
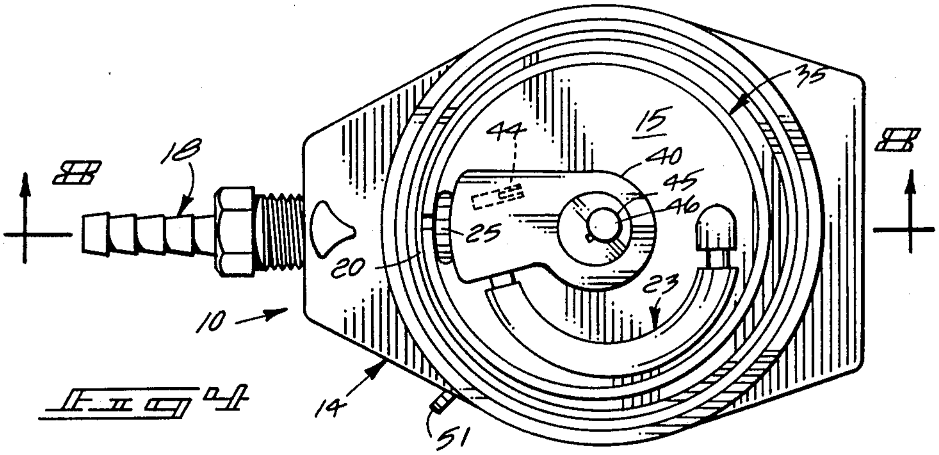
FIG. 4 is a view similar to FIG. 3 only showing an operative position of the clamping components thereof.

The prior art orifice selector device is generally indicated in FIG. 1 by reference numeral 100. The orifice selector device 100 is provided to receive fluid, usually liquid fertilizer or other chemical, from a fluid supply 101. There may be numerous selector devices 100 provided along a length of the fluid supply 101.

The device 100 includes a nipple 102 that projects into the fluid supply 101. An outward or upper end 103 of the nipple is adapted to receive a selected orifice disk 104. The selected disk 104 is typically one of a set available for each nipple 102. Each set may comprise 24 or more orifice disks. A fully operational fertilizing machine including, say, 60 applicator heads could therefore include 60 orifice selector devices 100 and 60 sets of 24 orifice disks, one set for each selector device 100.

The nipple 102 is secured to the fluid supply 101 by a saddle clamp arrangement 107 so the upper or outward end 103 projects upwardly beyond the clamp 107. The upward end 103 receives a barb fitting 105 that is releasably secured to the threaded upper end of the nipple by a nut 106. The nut 106 must be removed and the barb moved from engagement with the nipple in order to facilitate changing the orifice disk 104 contained therein. This procedure, while fairly simple, must be performed for each of the orifice devices. This is a burdensome and time consuming task especially in inclement weather and when the liquid being utilized is potentially hazardous. Storage and selection of the proper replacement disk is also a burdensome and time consuming task.

The present flow selector device generally designated in FIGS. 2–17 by reference numeral 10 is provided to facilitate fast and convenient selection of flow orifices without requiring disassembly of the flow device each time an orifice is to be changed. Nor does the present device require retention of numbers of individual orifice disks. Furthermore, the present device 10 is provided in a simple and efficient construction to facilitate minimal leakage of fluid during use. It is also constructed to facilitate ease of disassembly for maintenance or replacement purposes.

The present selector device 10 is intended to be mounted to a fluid supply 11 such as a delivery tube or pipe commonly utilized to supply fluid as in conventional fertilizer applicators, to selectively vary fluid flow to a series of spaced discharge points such as conventional fertilizer applicator heads (not shown). A flow selector device 10 will therefore be provided along the length of the fluid supply 11 for each fluid discharge point. Each device 10 includes features that enable integral, orifice selection to selectively control flow to the associated discharge points in a quick and efficient manner.

The present flow selector device 10 preferably includes a rigid housing 14. The housing 14 may be constructed of injection molded plastic material. Other materials may also be utilized, provided that they are appropriately rigid and that they are corrosion resistant. Furthermore, the housing may be formed by methods of other than injection molding. However, it is believed that injection molding processes may best be utilized to form the housing in an efficient and cost effective manner.

The housing 14 is formed with an internal chamber 15. It is preferred that the chamber 15 be substantially circular and open at a top end thereof. The bottom of the chamber is flat and includes an open drainage port 13. The top end of the chamber 15 is selectively spanned by a cover 16. Cover 16 may be formed in the same manner and of the same material as housing 14. Cover 16 includes a peripheral seal 17 (FIGS. 8, 9) that engages the housing about the chamber 15 to effectively seal the chamber against dust or debris when the cover is in place.

A first conduit 18 (FIGS. 8, 9) is provided in the housing 14. It includes an end 19 opening into the chamber 15. A first annular seal 20 is provided on the housing to encircle the first conduit open end. The first seal 20 is formed of a resilient, wear resistant material such as rubber.

The first conduit 18 extends outwardly from the chamber 15 to a discharge end 12. The discharge end 12 may be defined by a barb type connector element that will readily receive a common form of flexible tubing (not shown) as is commonly known in the fertilizer applicator art.

A second conduit 23 is also provided. Second conduit 23 extends from an open end 24 on a clamp means 34 (described below) within the chamber 15, through the housing to an end opening into the fluid supply 11.

The open end 24 is encircled by a second seal 25. The seal 25 may be substantially similar to the first seal 20.

In a preferred form second conduit 23 extends between clamp means 34 and housing 14 by way of a flex tube 26 which leads to a passage 27 formed through the housing 14. The passage 27 is in open communication with a connector 28 adapted to be connected to the fluid supply 11. A washer seal 29 may be provided about the connector 28 to effectively seal the connector in relation to the fluid supply 11. A saddle clamp device 30 may be provided to secure the housing to the fluid supply and to hold the connector 28 in place thereon.

Figure 17:
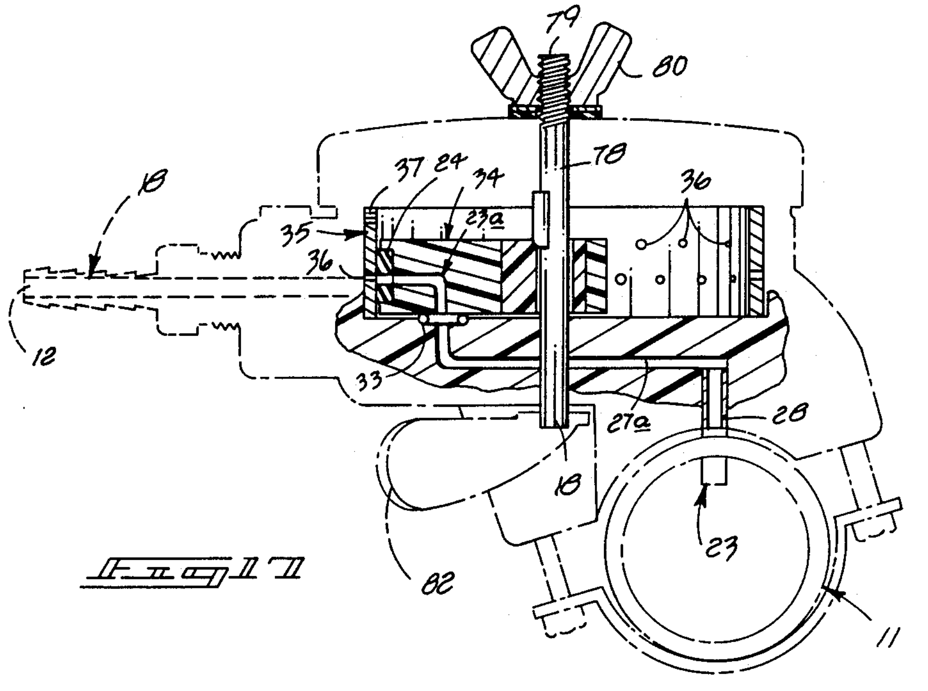
FIG. 17 is a fragmented sectional view showing an alternate second conduit formed in the housing and clamp arm of the present device.

A variation of the second conduit 23 is shown in FIG. 17. Here, a portion 23*a* of the conduit extends through the clamp means 34 and is slidably connected to a conduit section 27*a* that is formed through the housing 14. An "o" ring 33 is mounted about the open adjacent ends of the conduit sections 27*a* and 23*a* between the housing floor and the clamp means. The "o" ring 33 effectively seals the conduit sections to prevent leakage, yet allows translational movement of the clamp means relative to the housing.

An orifice plate 35 is rotatably received within the chamber 15 with a portion thereof positionable between the first and second conduits. The orifice plate 35 (FIGS. 14 and 15) is advantageously a substantially circular metal ring formed of a corrosion resistant material such as brass or bronze. Plate 35 includes a number of varying size orifices 36 spaced about its periphery. The orifices are advantageously provided in two sets. The sets of orifices are axially spaced apart along the circular plate 35. The orifices vary in size as shown in the flat pattern diagram of FIG. 15. The orifices sets may be selectively positioned in the chamber by inverting the plate so that either set of orifices may be aligned in the plane of the open ends 19, 24 of the first and second conduits 18, 23 respectively.

The plate 35 includes a notch 37 on each of its circular rims. The notches 37 are provided to receive a mating part 37*a* of the cover 16 to facilitate rotation of the plate in response to corresponding rotation of the cover. Indicia 38 (FIG. 5) may be provided about the perimeter of the cover 16 to visually indicate which orifice 36 of either set is currently in alignment with the first and second conduit open ends.

Figure 13:
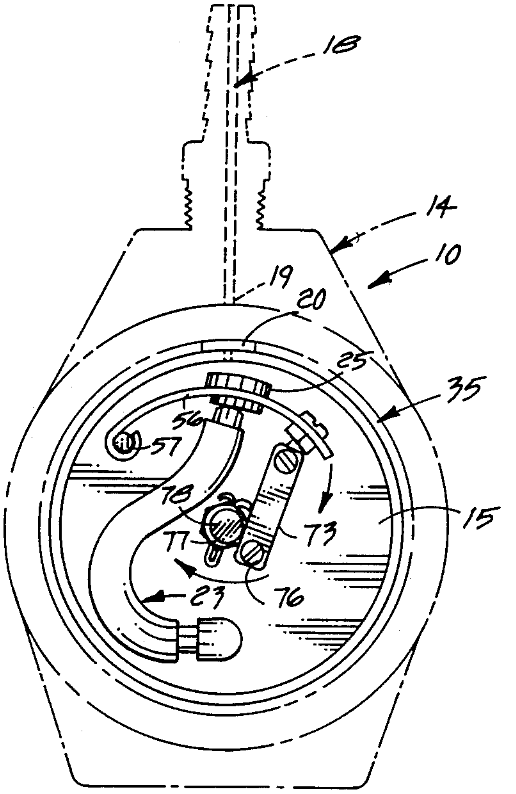
FIG. 13 is a view similar to FIG. 12 only showing an inoperative, release position of the components.

A clamp means 34 is provided within the housing 14. Clamp means 34 mounts the open end 24 of the second conduit. It also mounts the second seal 25. The clamp means 34 is provided in a first form as shown in FIGS. 3–8 and 17, a second form in FIGS. 9–11, and a third form as illustrated in FIGS. 12 and 13. All three forms of the clamp means 34 are provided to secure the orifice plate 35 in position between the first and second seals 20, 25.

The first form of clamp means 34 includes a clamp arm 40 movably mounted within the chamber 15. Clamp arm 40 may be formed of the same material as housing 14. Clamp arm 40 includes a portion of the second fluid conduit 23 and the second seal 25. The clamp arm 40 also includes an open passageway 41 formed therein as part of the second conduit 23. The passage extends to an open end that is encircled by the second seal 25. Clamp arm 40 further includes a slotted bottom surface for receiving a guide 44 (FIGS. 3 and 8) projecting upwardly from the housing 14. The guide 44 and a mating slot in the clamp arm serve as a translational guide means to permit only translational movement of the clamp arm between operative (FIG. 8) and inoperative (FIG. 9) positions.

An eccentric cam 45 is rotatably positioned within the housing and is slidably received within a bore 43 extending through the clamp arm 40. The eccentric cam 45 is mounted to an operator 46 for rotation about an axis that may be coaxial with the central axis of the chamber 15. A key 47 is provided between the operator and cam 45 to prevent relative rotation between the two elements.

The operator 46 extends axially from a top end 48 to a bottom end 50. The top end 48 is threaded to receive a wing nut 49. A handle 51 is situated at the bottom operator end 50. Both ends of the operator project outwardly from the housing 14. The top end projects upwardly through a hole in the cover 16 and the bottom end 50 projects downwardly through a hole provided in the housing. The handle 51 extends laterally from operator end 50 for manual actuation to selectively rotate the eccentric cam 45.

Selective operation of the handle 51 will cause the cam 45 to rotate and forcibly move the clamp arm 40 between an operative, clamping position and an inoperative release position. In the clamping position, the clamp arm has moved translationally to foribly grip the plate 35 between the first and second seals 20, 25. In the inoperative position, the clamp arm has been moved translationally to separate the first and second seals to facilitate movement of the plate therebetween.

Figure 9:
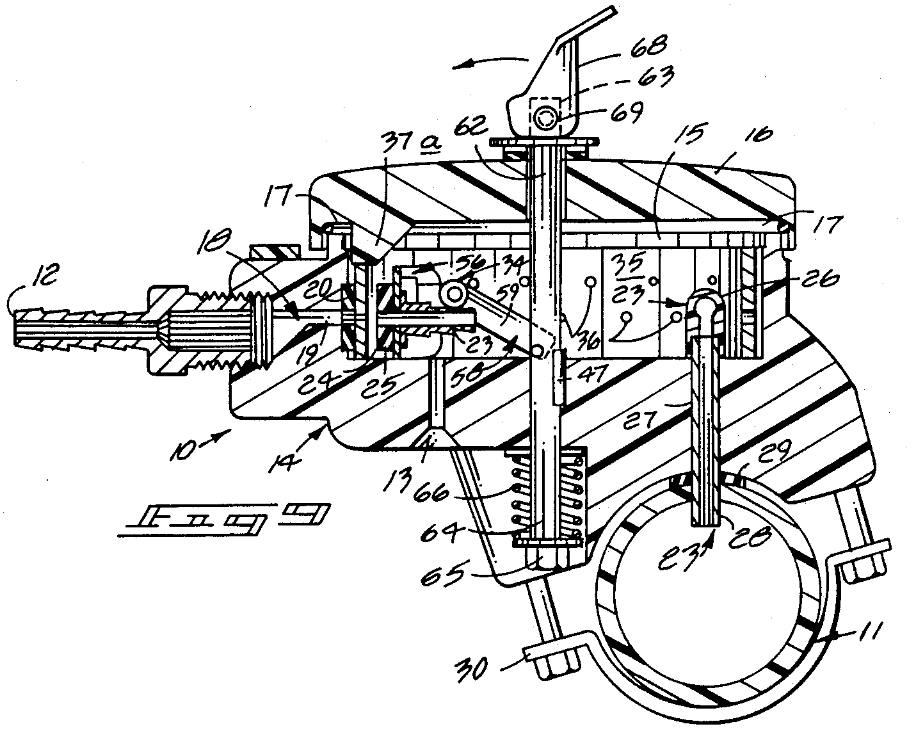
FIG. 9 is a sectional view similar to FIG. 8 only showing alternate clamp components.
Figure 14:
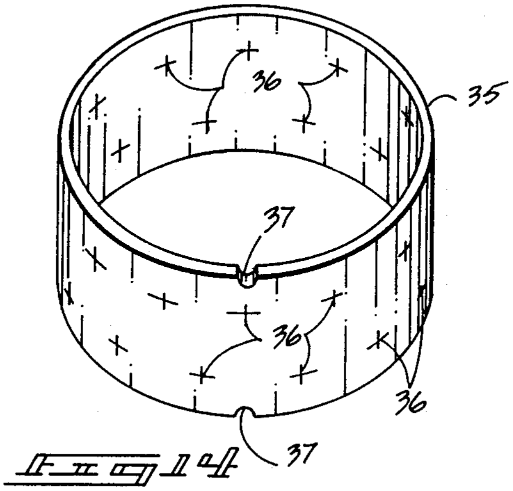
FIG. 14 is a perspective view of a orifice plate indicating a pattern of orifices thereon.
Figure 15:
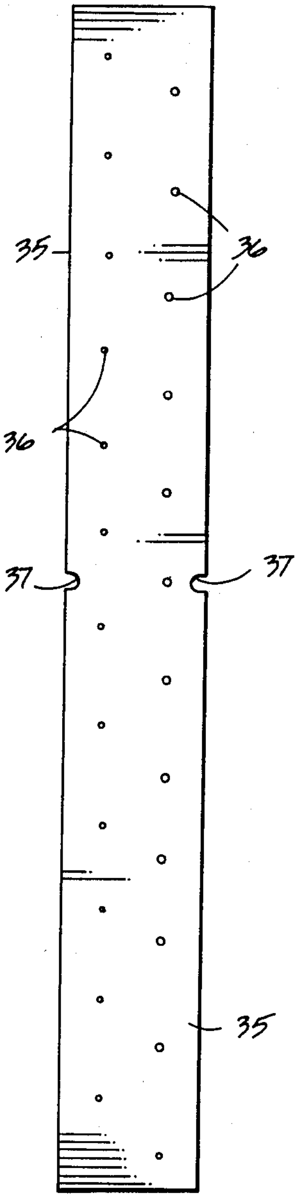
FIG. 15 is a flat pattern view of the orifice plate.

A second form of clamp arm 56 is illustrated in FIGS. 9–11. Clamp arm 56 may be comprised of a resilient spring member mounted to the housing 14 by a pin 57 (FIG. 11). The arm will resiliently flex in a substantially radial direction with respect to the central axis of the chamber through operation of a toggle means generally shown at 58.

The toggle means may include a link 59. Link 59 includes an end pivotally connected to the clamp arm 56 and a remaining end connected to an operator 62.

The operator 62 projects through the housing and includes a top end 63 projecting upwardly from the cover 16 and a bottom end 64 projecting below the housing. Bottom end 64 includes a head 65. A compression spring 66 is mounted between the head 65 and the bottom surface of the housing. The spring 66 is provided to resist upward motion of the operator 62 responsive to operation of a cam lock 68.

The cam lock 68 is provided at the top end 63 of operator 62. Cam lock 68 is mounted to the operator 62 by a releasable pivot 69. The cam lock 68 may be selectively pivoted about the axis of pivot 69 to selectively move the operator 62 axially within the chamber. The axially moving operator 62 causes corresponding movement of the toggle 58 and clamp arm 56. FIGS. 9 and 11 illustrate the cam lock 68 in an inoperative position. In this position, the spring 66 has moved the operator and link 59 downwardly, to move the clamp arm 56 to an inoperative position as shown in FIG. 11.

In FIG. 10, the cam lock 68 has been pivoted to an operative position. In this position, the operator 62 has been elevated, lifting the link 59 to an operative position. The toggle, when moving to this operative position, correspondingly causes the clamp arm 56 to swing toward the plate 35, clamping the plate 35 between the first and second seals 20, 25.

It may be noted that the cam lock 68 also functions to selectively secure the cover 16 axially in position. This is accomplished as the cam lock 68 is operated against resistance offered by spring 66 to shift the clamp arm 56 to its operative position. Thus, the cam lock 68 will function to secure the cover in position when the clamp arm 56 is swung to clamp the plate 35 in position. The cam lock 68 will also release the cover to permit rotation thereof when the clamp arm is pivoted to its inoperative position. This facilitates selective rotation of the cover and the engaged plate when the clamp arm is held in its inoperative, release position.

Figure 16:
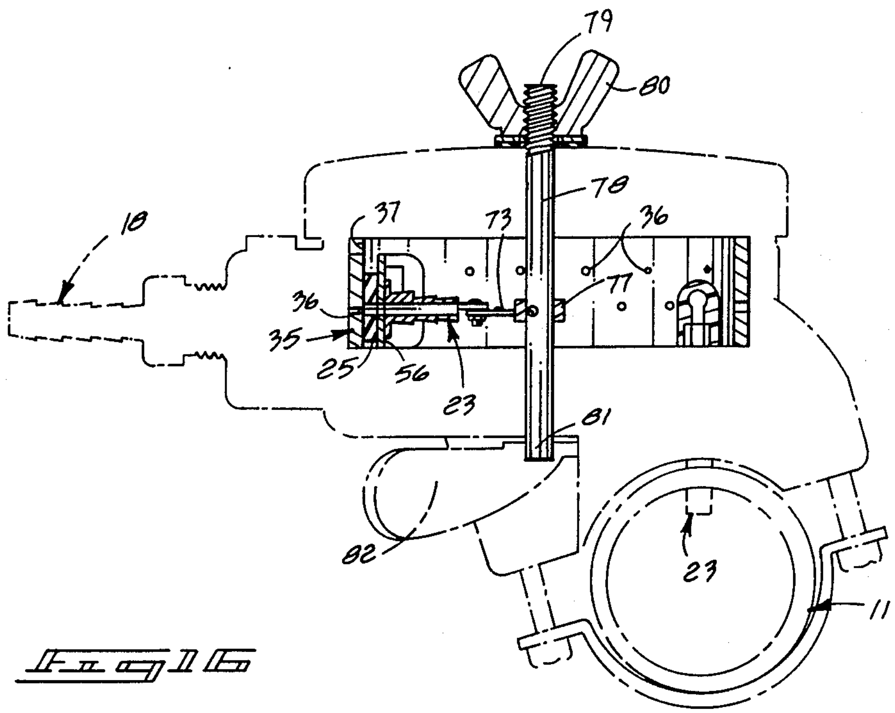
FIG. 16 is a sectional view taken substantially along line 16—16 FIG. 12, only showing a complete operator mechanism.

Another form of the clamp means 34 is generally illustrated at 71 in FIGS. 12, 13 and 16. This form makes use of a link 73 extending from an end pivotally connected to the clamp arm 56. The remaining end of link 73 is mounted at a pivot 76 to a crank 77. The crank 77, in turn, is mounted to an operator 78. The operator 78, in this embodiment, is rotatable within the housing to effect motion of the clamp arm 56 between operative and inoperative positions. Rotation of the operator 78 may be facilitated by means of a handle 82 mounted at a bottom end 81 of operator 78. The top end 79 of the operator may also be provided with a wing nut arrangement 80.

Operation of this form of clamp means 34 may simply be effected by rotating the operator 78 to selectively move the crank 77 and link 73 to shift the clamp arm between operative (FIG. 12) and inoperative (FIG. 13) positions. It may be noted that the operative position of the link and crank arrangement is such that the two elements move to the an "over-center" relationship (FIG. 12) to lock the clamp arm 56 in its operative position.

Prior to operation, if necessary, a preferred set of orifices may be selected (if the plate is supplied with more than one set) by simply detaching the wing nut or cam lock and removing the cover 16. The plate 35 may then be easily slipped outward of the chamber. The plate 35 may then be inverted if necessary to selectively bring the selected set of orifices into a downward orientation. The orifice plate can then be placed back within the housing. The cover can then be again placed over the chamber 15 with care being taken to engage the cover mating part 37*a* with the notch 37 along the presently upwardly facing edge of the plate. This assures proper registry between the orifice plate 35 and the cover 16 so the indica 38 will properly indicate which orifice size is presently aligned with the first and second conduit open ends 19, 24. The wing nut or cam lock may now be replaced at the upward end of the associated operator, in a loose manner to allow rotation of the cover and the orifice ring.

Operation of the present invention to selectively align a selected orifice 36 with the open ends 19, 24 of the first and second conduits may now be easily and quickly accomplished.

In the first embodiment of the clamp means 34, the wing nut 49 is left loose on the operator 46 or, if tight, is first loosened to facilitate rotation of the cover 16 and operation of the handle 51.

After the wing nut is loosened, the handle 51 may be rotated to shift the clamp arm from the operative position (FIG. 8) to an inoperative position (FIG. 9). This is done simply by shifting the handle selectively to rotate the eccentric cam 45. Rotation in a prescribed direction will cause corresponding movement of the clamp arm to separate the first and second seals and facilitate selective motion of the plate therebetween.

Figure 5:
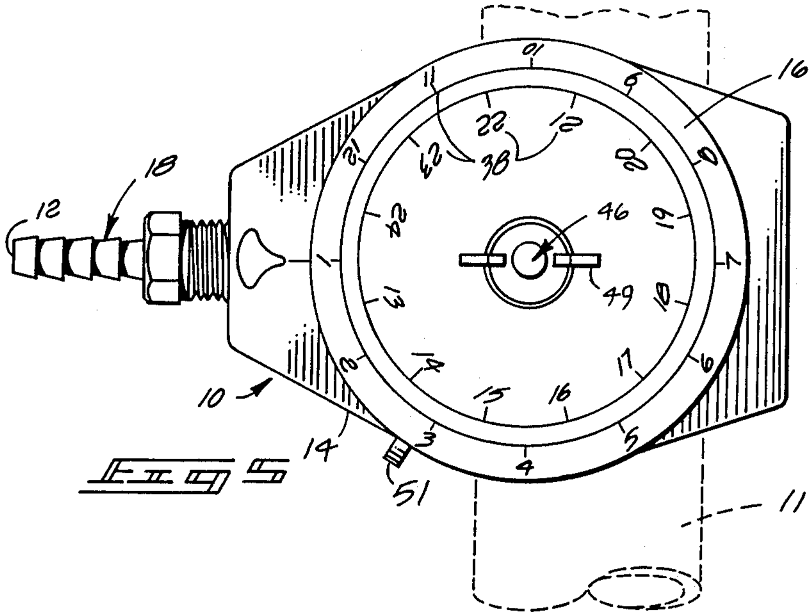
FIG. 5 is a top plan view as seen from above in FIG. 2.
Figure 6:
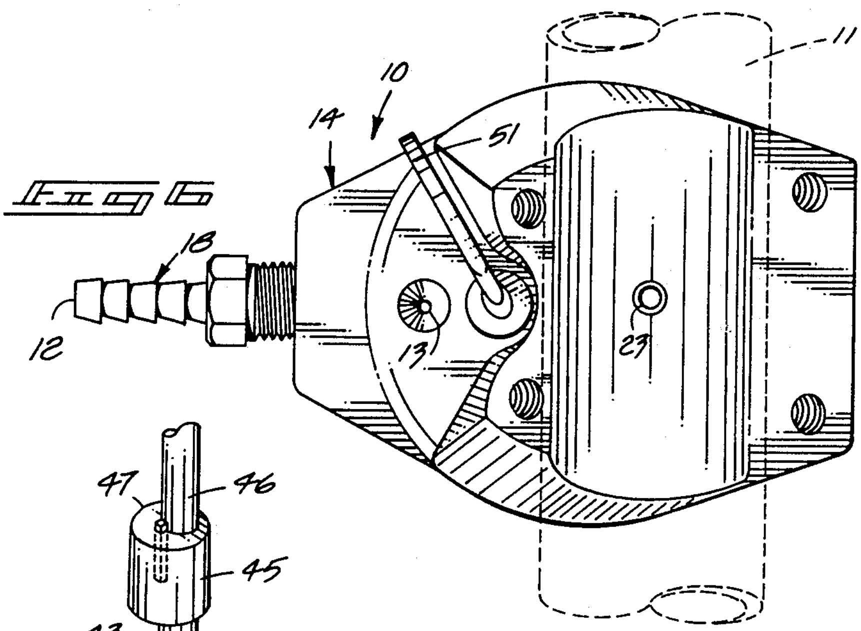
FIG. 6 is a bottom plan view as seen from below in FIG. 2.
Figure 7:
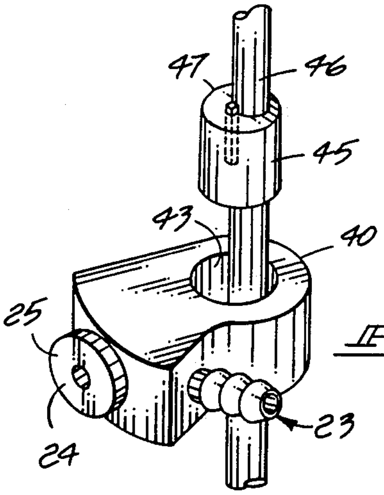
FIG. 7 is a detail partially exploded perspective view of the first form of clamp means utilized in the present invention.
Figure 8:
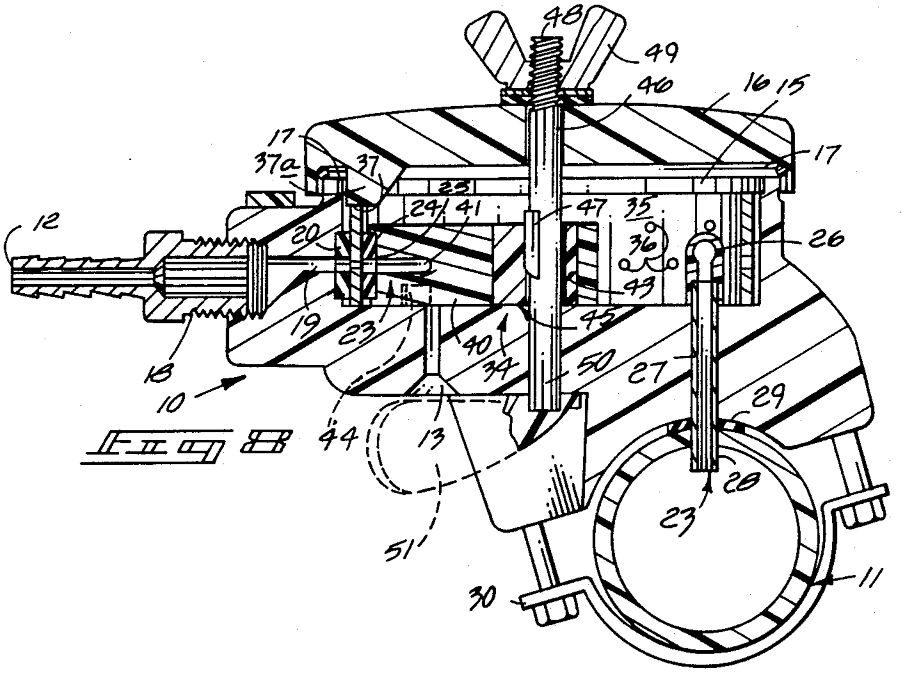
FIG. 8 is a cross-sectional view taken substantially along 8—8 in FIG. 4.

With the wing nut and clamp means thus loosened, the cover 16 can be easily rotated to bring a selected orifice size into alignment with a pointer on the housing (FIG. 5). Rotation of the cover will cause corresponding rotation of the plate and the selected orifice 36 will rotate into alignment with the first and second conduit openings 19, 24 as the desired marking comes into alignment with the pointer on the outside of the housing.

When the proper orifice is selected, the user may rotate the handle 51 to shift the clamp arm back to the operative position. The rotating eccentric cam 45 causes corresponding translational movement of the clamp arm 40 to bring the first and second seals 20, 25 toward one another to securely clamp the plate and hold the selected orifice in position within the fluid flow path now established between the first and second conduits. Sufficient pressure may be exerted by the cam to tightly secure the plate in position with the selected orifice encircled by the seals to thereby prevent leakage. The eccentric cam 45 may be moved to a slightly over-center position (FIG. 4) to effectively lock the clamp arm in the operative position until the handle is again operated to shift the clamp arm to the open inoperative position. Once the clamp arm 40 is moved to the operative position, the wing nut 49 may be tightened to secure the cover in position, thereby further preventing rotation of the cover and the attached plate.

Operation of the present device using the second form of clamp means 34 may be accomplished in a manner somewhat similar to that for the first form. This is of course with the exception that instead of a wing nut, the cam lock 68 is selectively operated to shift the clamp arm 56 between operative and inoperative positions. The cam lock 68 can be shifted to an inoperative position, causing corresponding motion of the link 59 to separate the first and second seals 20, 25 to thereby facilitate rotation of the plate 35. The cam lock 68, when pivoted to this position also facilitates rotation of the cover 16 by releasing clamping pressure exerted through the operator by spring 66. The cover may then be rotated to correspondingly rotate the plate to bring a selected orifice into position between the seals 20, 25 and in alignment with the conduits 18, 23. The cam lock can then again be actuated to secure the cover in place and to shift and lock the toggle means 58 to securely clamp the plate between the first and second seals. The selected orifice is thus simply and effectively sealed in position to affect flow of fluid through the presently connected conduits 18 and 23, and the cover is simultaneously clamped down on the housing to seal the chamber against dust and debris.

Operation of the present device utilizing the third form of clamp means 34 may be accomplished in a manner substantially similar to the operation of the first form. The difference is within the mechanical motion of link 73 and crank 77. The wing nut 80 may be released to allow rotational motion of the cover 16 and to enable the handle 82 to be shifted. As the handle is shifted to one position, the link 73 and crank 77 will function to pull the resilient clamp arm 56 to an inoperative position wherein the seals 20, 25 are spaced apart to facilitate rotation of the plate 35. The cover 16 can then be selectively rotated to reposition the plate 35 with a selected orifice in line with the first and second fluid conduits 18, 23. The handle 82 can then be operated to reverse the motion of the link 73 and crank 77 to bring the clamp arm back into its operative position, securely clamping the plate between the first and second seals. It should be noted that the linkage shifts to an over-center locked condition (FIG. 12) in this position so the plate will remain clamped until the handle is manually shifted to unlock and move the clamp arm to the inoperative arm to the inoperative position.

With any of the clamp forms identified above, the orifice plate 35 may be easily and quickly removed from the housing to facilitate cleaning, replacement or inversion and replaced to bring another set of orifices into planar alignment with the conduit openings. This is done simply by removing the cover 16 and lifting the orifice plate outward of the housing.

The above described device is extremely simple to operate and very reliable. The simple mechanical movements to selectively clamp and release the orifice plate will function with minimal maintenance and in a very reliable manner to selectively secure any selected orifice in the flow line between the seals. Furthermore, the clamping arrangements are provided with significant leverage advantage to exert a substantial amount of clamping force against the plate to securely seal the selected orifice between the first and second conduits. This will effectively eliminate leaking about the seals.

It is noted that in all forms of the clamp means, the seals 20, 25 are moved substantially translationally into and away from engagement with the plate. The seals 20, 25 are engaged and clamp the plate securedly against leakage when the plate is in a stationary position in relation to the first and second conduits. The plate will move freely only when the seals are separated. The separated seals allow the plate to freely rotate within the housing without frictional engagement between the plate and the seals. This feature thereby minimizes wear of the seals and maximizes the useful life of the device, while providing substantial sealing pressures to be applied against the plate to prevent leakage.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A flow selector device, comprising:

a housing including a chamber formed therein;

a first conduit with an open end opening into the chamber;

a first annular seal member on the housing encircling the first conduit open end;

a plate mounted within the housing chamber having a plurality of orifices of selected sizes formed therein, the plate being selectively movable within the chamber to bring a selected orifice into registry with the first conduit end;

wherein the plate is circular about an axis and wherein the plurality of orifices are spaced angularly about the axis, the plate being rotatable about the axis within the housing chamber to selectively move a selected orifice into registry with the open end of the first conduit;

a second annular seal;

a second conduit having an open end encircled by the second seal;

clamp means on the housing mounting the open end of one of the conduits and the respective annular seal, for selective operation to (a) securely clamp the plate with a selected orifice thereof sealed between the first and second annular seals and in registry with the first and second conduit ends and (b) release the plate for selected movement within the chamber.

2. The device of claim 1 wherein the first conduit is comprised of a bore extending through the housing and wherein the second conduit includes a flexible tube connected to the clamp means.

3. The device of claim 1 wherein the plate is cylindrical and is removable from the housing and includes two sets of orifices, spaced axially to facilitate selective inversion of the plate to move either set of orifices into operative alignment with the open end of the first conduit.

4. The device of claim 1 wherein the clamp means is comprised of;

a clamp arm movably mounted within the housing chamber and mounting the second fluid conduit and the second seal;

an eccentric cam means engaging the clamp arm and rotatably mounted within the housing for selectively moving the clamp arm between an operative position wherein the plate is forcibly gripped between the first and second seals and an inoperative position releasing the plate to facilitate selective motion thereof;

operator means on the housing operatively connected to the cam means and including a handle outward of the housing for facilitating manual actuation of the eccentric cam means.

5. The device of claim 4 further comprising a translational guide means on the housing and engaging the clamp arm to permit only translational movement of the clamp arm between the operative and inoperative positions.

6. The device of claim 1 wherein the plate is cylindrical about the axis and wherein the plurality of orifices are spaced angularly about the periphery of the cylinder, and further comprising:

a cover rotatably mounted to the housing, spanning the chamber and interconnected with the cylindrical plate such that rotation thereof will cause corresponding rotation of the cylindrical plate; and calibrated indicia means on the cover and housing operably engaging the plate for identifying a selected orifice presently in registry with the open end of the first conduit.

7. The device of claim 1 wherein the clamp means is comprised of:

a clamp arm movably mounted within the housing chamber and mounting the second fluid conduit and second seal thereon;

toggle means connected to the clamp arm for selectively moving the clamp arm between an operative position wherein the plate is gripped between the first and second seals, and an inoperative position wherein the plate is released; and operator means connected to the toggle means for selectively moving the toggle means between the operative and inoperative positions from a location outside the chamber.

8. The device of claim 7 further comprising:

a removable cover spanning the chamber; and a cam lock means on the operator means and engaging the cover for selectively locking the toggle means in the operative position.

9. The device of claim 8 wherein the operator means is translationally movable along an axis passing through the housing and further comprising biasing means for urging the operator and toggle means to shift the clamp arm to the inoperative position.

10. The device of claim 9 further comprising:

a cover rotatably mounted to the housing, spanning the chamber and interconnected with the circular plate such that rotation thereof will cause corresponding rotation of the circular plate; and calibrated indicia means on the cover and housing for identifying a selected orifice presently in registry with the open end of the first conduit.

11. The device of claim 7 wherein the plate is a cylindrical tube formed about an axis and wherein the plurality of orifices are spaced angularly about the periphery of the cylindrical tube, the plate being rotatable about the axis within the housing chamber to selectively move a selected orifice into registry with the open end of the first conduit.

12. The device of claim 11 wherein the plate is removable from the housing and includes two sets of orifices, spaced axially to facilitate selective inversion of the plate to move either set of orifices into operative alignment with the open end of the first conduit.

13. The device of claim 7 wherein the operator is rotatable about an axis and the toggle means is comprised of:

a link having one end pivotably connected to the clamp arm and a remaining end; and a crank interconnecting the remaining link end and the operator means for operating the link to move the clamp arm between the operative and inoperative positions responsive to rotational motion of the operator means.

14. The device of claim 13 wherein the link, crank and operator means are oriented relative to the axis such that the link and crank are movable to an over-center locked position corresponding to the operative position of the clamp arm.

15. The device of claim 14 wherein the plate is circular about an axis and wherein the plurality of orifices are spaced angularly about the axis, the plate being rotatable about the axis within the housing chamber to selectively move a selected orifice into registry with the open end of the first conduit.

16. The device of claim 15 wherein the plate is removable from the housing and includes two sets of orifices, spaced axially to facilitate selective inversion of the plate to move either set of orifices into operative alignment with the open end of the first conduit.

17. A flow selector device, comprising:

a housing including a chamber formed therein;

a first conduit with an open end opening into the chamber;

a first annular seal member on the housing encircling the first conduit open end;

a plate mounted within the housing chamber having a plurality of orifices of selected sizes formed therein, the plate being selectively movable within the chamber to bring a selected orifice into registry with the first conduit end;

a second annular seal;

a second conduit having an open end encircled by the second seal;

clamp means within the housing mounting the open end of the second conduit and the second annular seal, for selective operation to (a) securely clamp the plate with a selected orifice thereof sealed between the first and second seals and in registry with the first and second conduit ends and (b) release the plate for selected movement within the chamber;

wherein the clamp means is comprised of a clamp arm movably mounted within the housing chamber and mounting the second fluid conduit and the second seal;

an eccentric cam means engaging the clamp arm and rotatably mounted within the housing for selectively moving the clamp arm between an operative position wherein the plate is forcibly gripped between the first and second seals and an inoperative position releasing the plate to facilitate selective motion thereof; and operator means on the housing operatively connected to the cam means and including a handle outward of the housing for facilitating manual actuation of the eccentric cam means.

18. A flow selector device, comprising:

a housing including a chamber formed therein;

a first conduit with an open end opening into the chamber;

a first annular seal member on the housing encircling the first conduit open end;

a plate mounted within the housing chamber having a plurality of orifices of selected sizes formed therein, the plate being selectively movable within the chamber to bring a selected orifice into registry with the first conduit end;

a second annular seal;

a second conduit having an open end encircled by the second seal;

clamp means within the housing mounting the open end of the second conduit and the second annular seal, for selective operation to (a) securely clamp the plate with a selected orifice thereof sealed between the first and second seals and in registry with the first and second conduit ends and (b) release the plate for selected movement within the chamber;

wherein the clamp means is comprised of a clamp arm movably mounted within the housing chamber and mounting the second fluid conduit and second seal thereon;

toggle means connected to the clamp arm for selectively moving the clamp arm between an operative position wherein the plate is gripped between the first and second seals, and an inoperative position wherein the plate is released; and operator means connected to the toggle means for selectively moving the toggle means between the operative and inoperative positions from a location outside the chamber.

* * * * *